No. 888,690. PATENTED MAY 26, 1908.
V. R. & E. H. BROWNING.
LOCOMOTIVE CRANE.
APPLICATION FILED JAN. 27, 1905.

7 SHEETS—SHEET 1.

Witnesses:
A. L. Lord.
B. W. Brockett.

Inventors,
Victor R. Browning
Earl H. Browning,
By Foits & Hull,
Attorneys.

No. 888,690. PATENTED MAY 26, 1908.
V. R. & E. H. BROWNING.
LOCOMOTIVE CRANE.
APPLICATION FILED JAN. 27, 1905.

7 SHEETS—SHEET 2.

Witnesses:
A. L. Lord.
B. W. Brockett.

Inventors,
Victor R. Browning
Earl H. Browning.
By Foutse Hull, Attorneys.

No. 888,690. PATENTED MAY 26, 1908.
V. R. & E. H. BROWNING.
LOCOMOTIVE CRANE.
APPLICATION FILED JAN. 27, 1905.
7 SHEETS—SHEET 4.
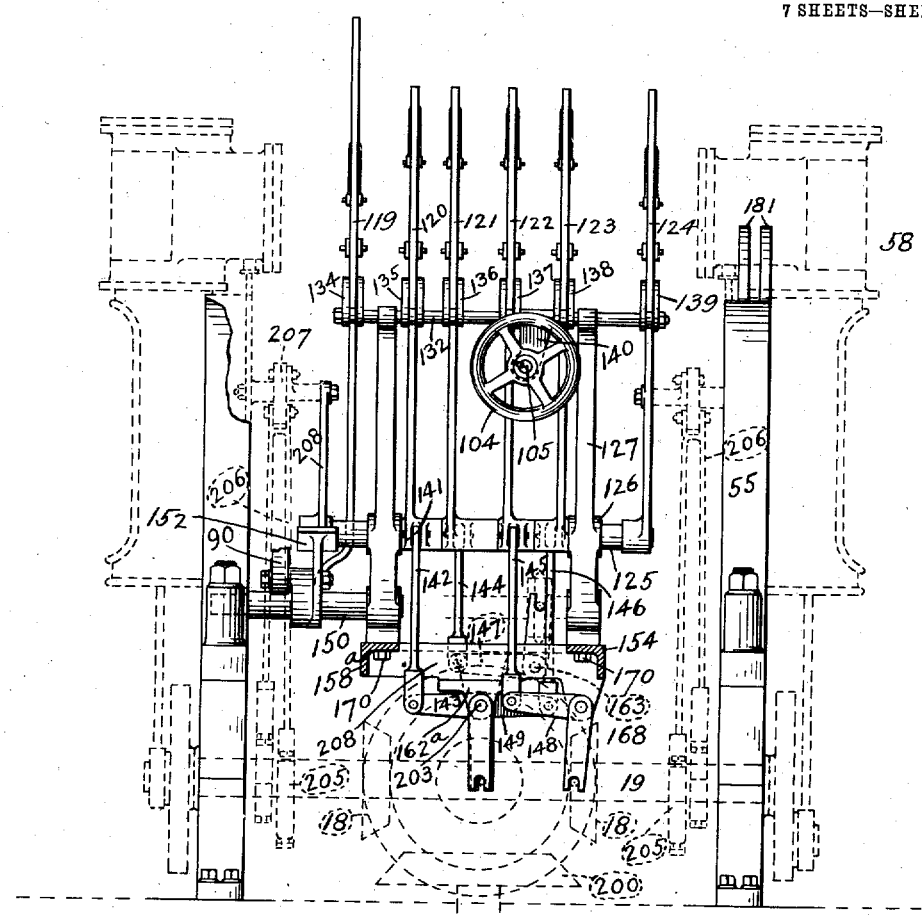
Fig. 4.
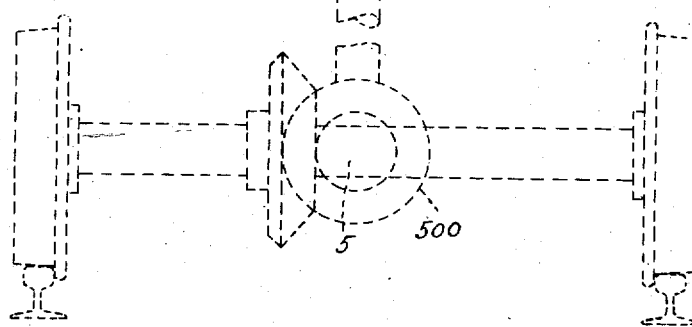
Witnesses:
A. L. Lord.
B. W. Brockett.
Inventors,
Victor R. Browning and
Earl H. Browning,
By Fouts & Hull, Attorneys.

No. 888,690. PATENTED MAY 26, 1908.
V. R. & E. H. BROWNING.
LOCOMOTIVE CRANE.
APPLICATION FILED JAN. 27, 1905.
7 SHEETS—SHEET 5.
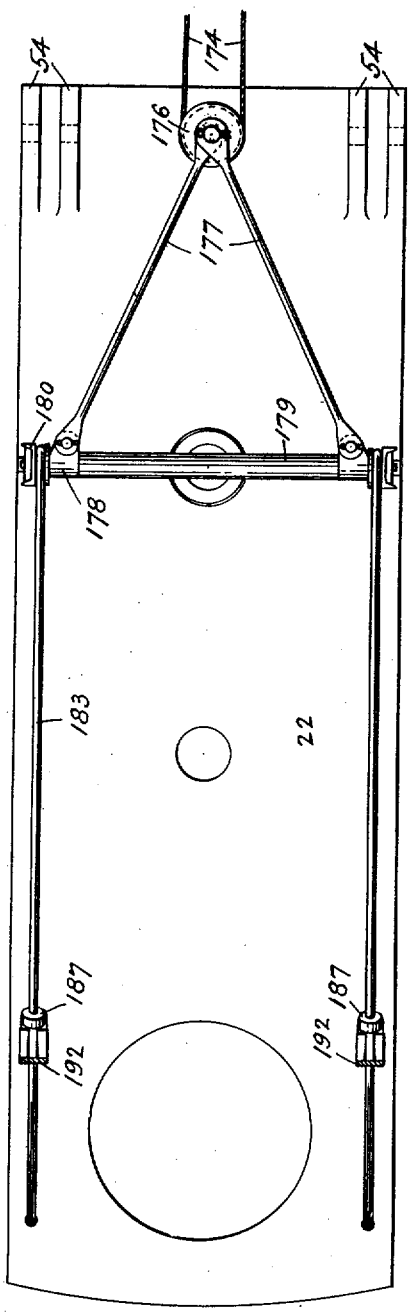
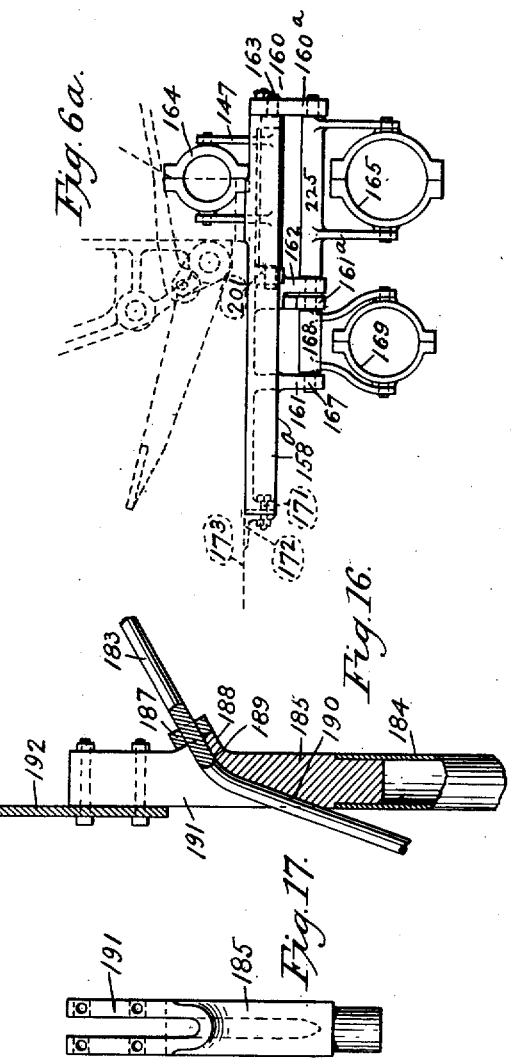
Fig. 15. Fig. 6a. Fig. 16. Fig. 17.
Witnesses:
A. L. Lord.
B. W. Brockett.
Inventors,
Victor R. Browning
and
Earl H. Browning.
By Fouts & Hull, Attorneys.

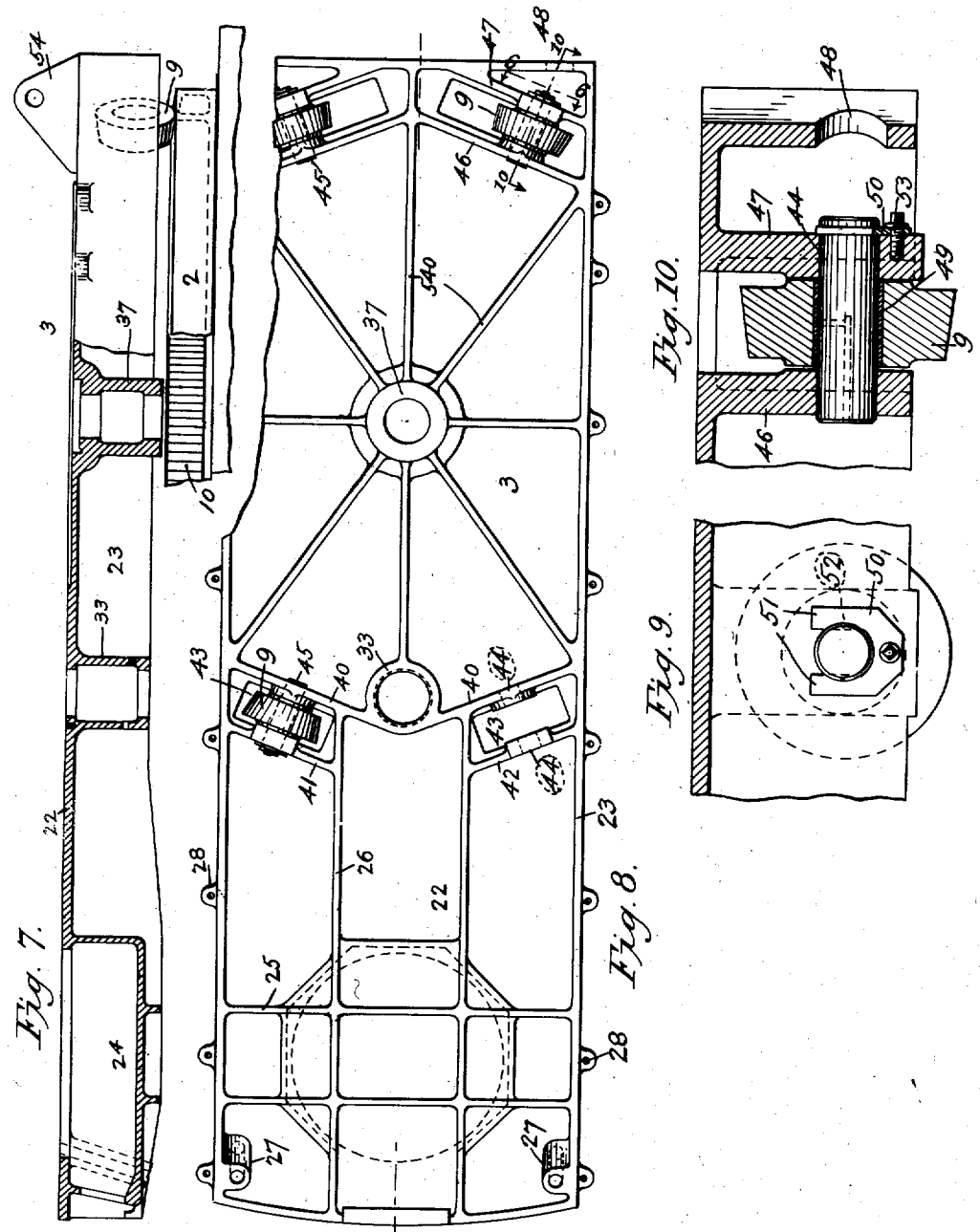

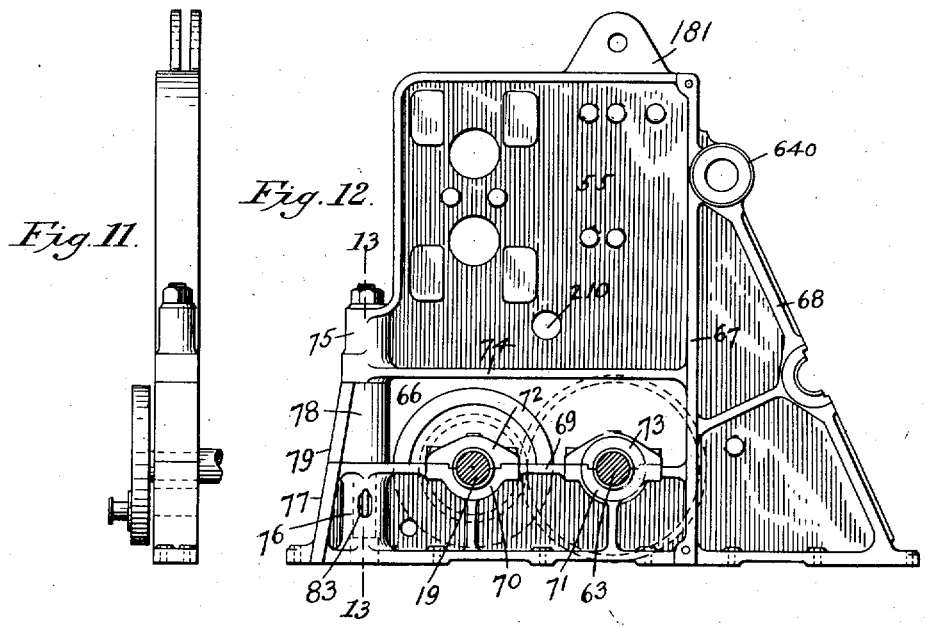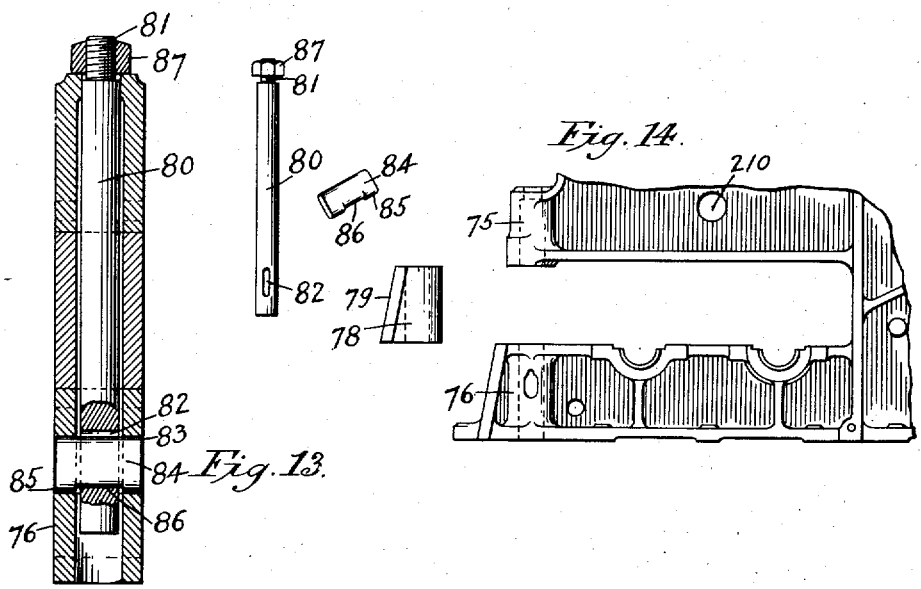

UNITED STATES PATENT OFFICE.

VICTOR R. BROWNING AND EARL HARRISON BROWNING, OF NOTTINGHAM, OHIO.

LOCOMOTIVE-CRANE.

No. 888,690.       Specification of Letters Patent.       Patented May 26, 1908.

Application filed January 27, 1905. Serial No. 242,849.

*To all whom it may concern:*

Be it known that we, VICTOR R. BROWNING and EARL H. BROWNING, residing at Nottingham, in the county of Cuyahoga and State of Ohio, have invented a certain new and useful Improvement in Locomotive-Cranes, of which the following is a full, clear, and exact description, reference being had to the accompanying drawings.

Our invention relates to locomotive railway cranes and has for its object the provision of a crane of this character which shall be economical in construction, easily assembled and disassembled, and efficient and durable in operation.

The invention may be briefly summarized as consisting of the combinations of elements embodied in the claims hereto annexed.

Figure 1:
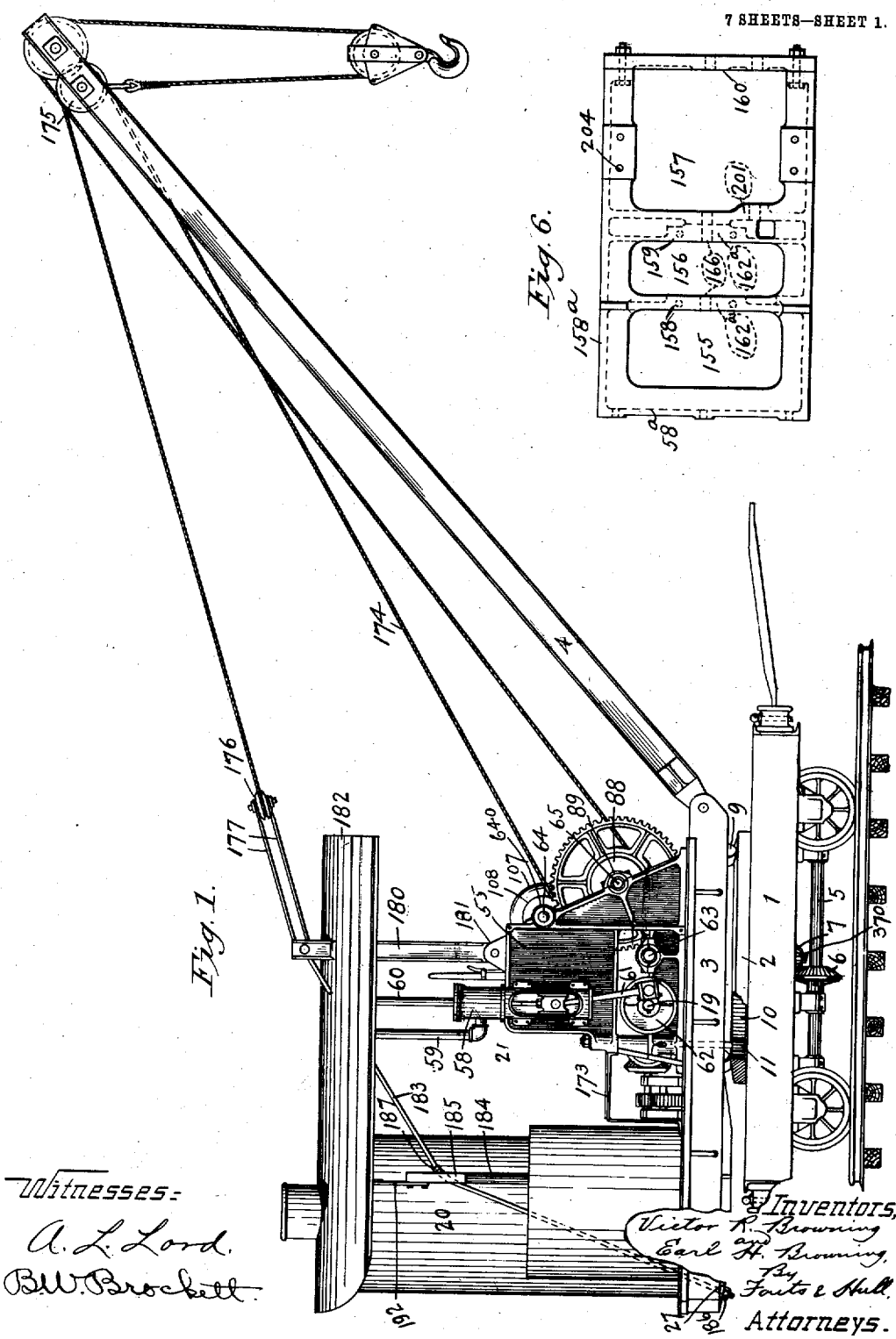
Figure 2:
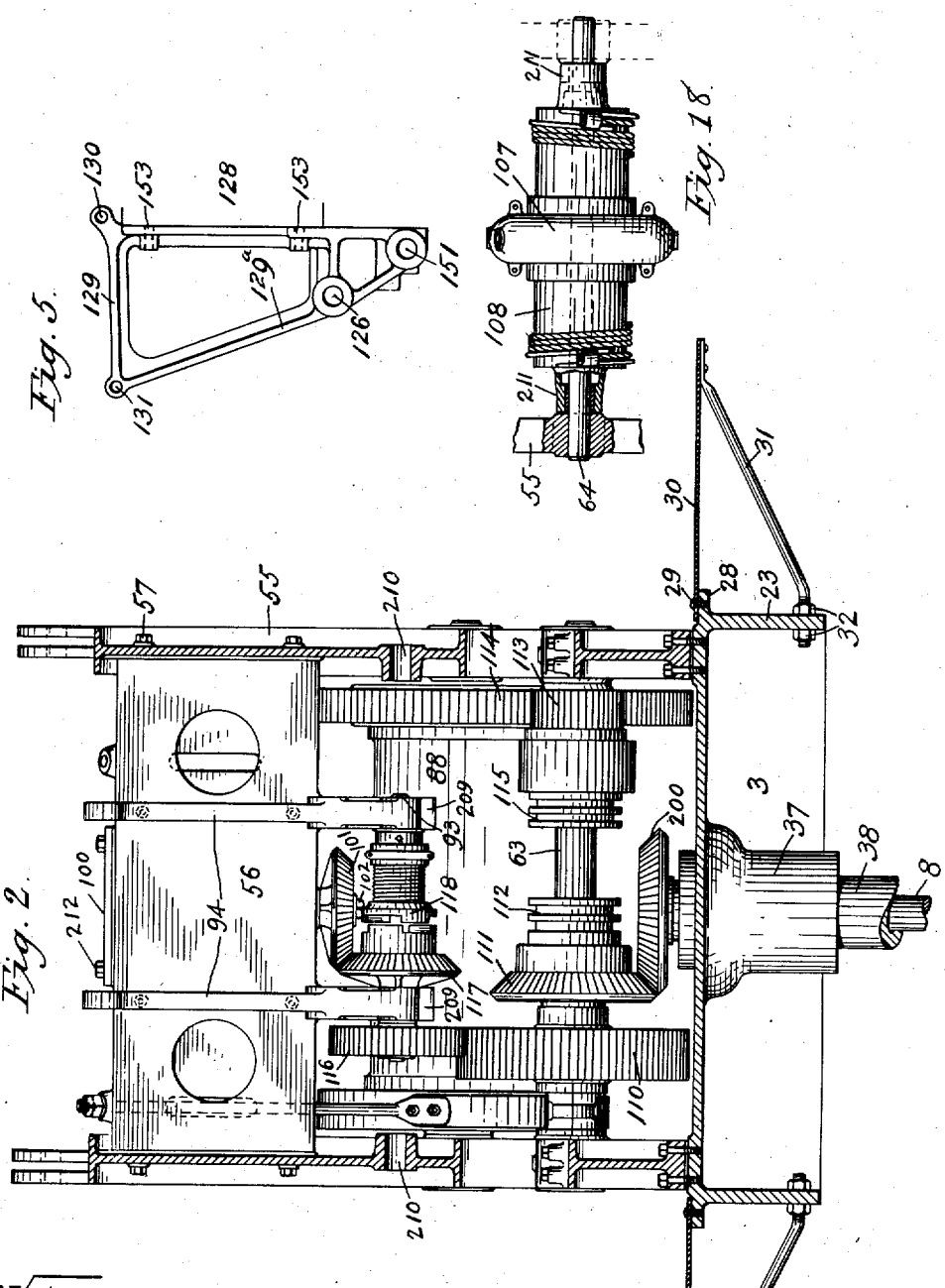
Figure 3:
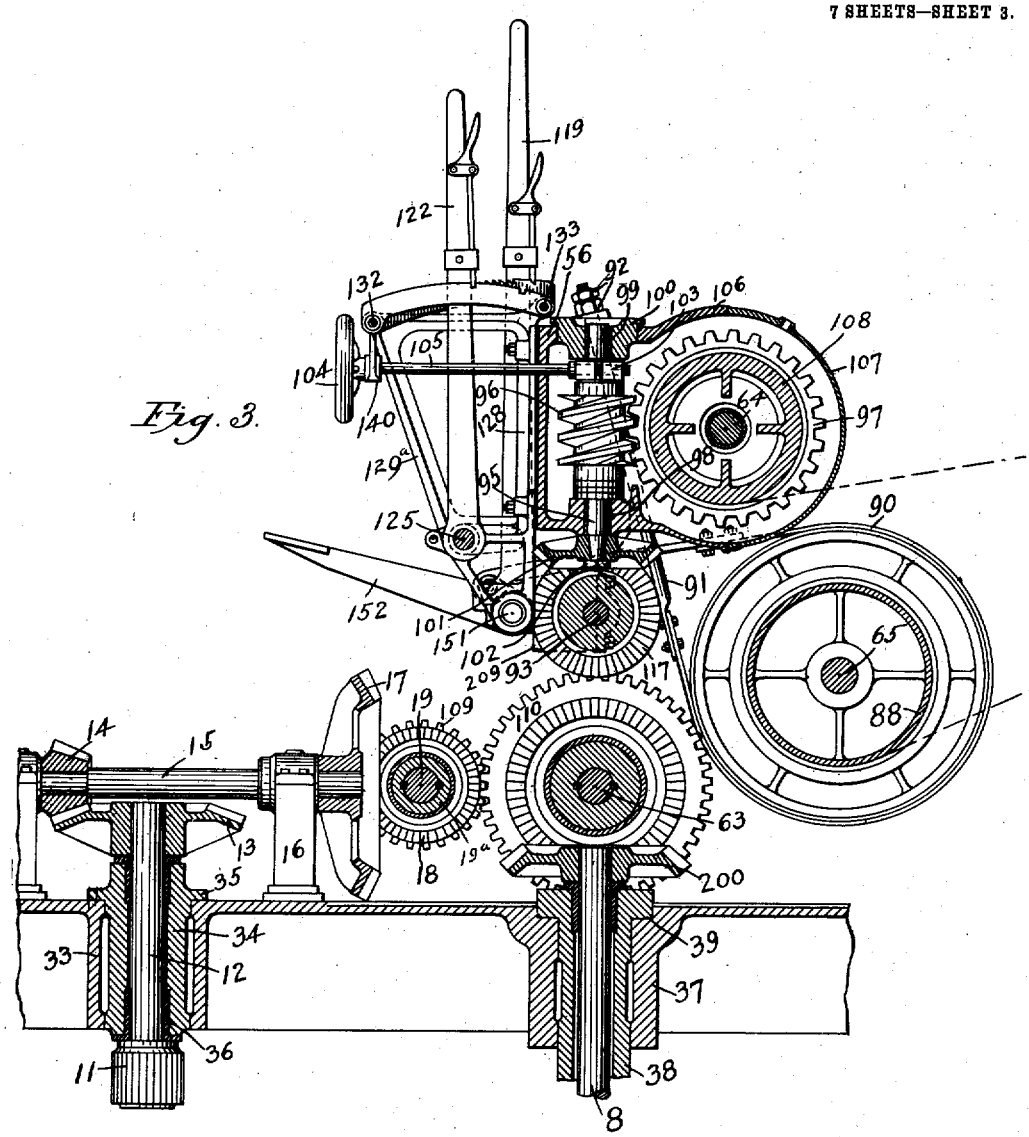

Referring to the drawings:—Figure 1 represents a side elevation of our complete crane; Fig. 2 represents an enlarged sectional view taken through the housings just forward of the engine shaft, the lever brackets being shown in elevation and the operating levers being removed for clearness of illustration; Fig. 3 represents a similar section at right angles to the plane of Fig. 2, showing some of the operating levers; Fig. 4 represents an enlarged elevation of the levers, brackets and housings, some of the shaftings and the engines and operating mechanism being shown in dotted lines; Fig. 5 represents a side elevation of one of the lever brackets; Fig. 6 represents a plan view of the frame which carries the clutch-operating shafts; Fig. 6ª represents a side elevation of such frame; Fig. 7 represents a view, partly in section and partly in side elevation, of the floor frame and the slip ring for rotating said frame and the crane supported thereon; Fig. 8 represents a bottom plan view of the floor frame; Figs. 9 and 10 represent enlarged detail views of the roller bearings for the floor frame; said views being taken on the lines 9—9 and 10—10 of Fig. 8 respectively. Figs. 11 and 12 represent respectively an end and a side elevation of one of the side housings; Fig. 13 represents an enlarged sectional view on the line 13—13 of Fig. 12; Fig. 14 represents a detail showing the manner in which access may be had to the shafting carried by the housings; Fig. 15 represents a top plan view of the floor frame, showing the manner of staying the boom hoisting apparatus; Fig. 16 represents a sectional detail of the saddle and stay rod; Fig. 17 represents a front elevation of said saddle; and Fig. 18 represents a front elevation of the boom-hoisting drum.

Our crane consists generally of a truck 1 on which the crane proper is mounted for travel along the track, a slip ring 2 on which the crane proper may be rotated, a floor frame 3 for the crane, a boom 4 pivoted to the forward end of said floor frame, and suitable engines and mechanism carried by said floor frame for hoisting and lowering the boom, driving and rotating the crane, and for operating other mechanism.

The truck is provided with a driving shaft 5 having suitable gears 500 for driving the axles (see Figs. 1 and 4) and with a gear 6 operated by a gear 7 at the end of a vertical traveling shaft 8 extending through the floor frame 3 (Figs. 1 and 2). The slip ring 2 carried by the truck is provided with an inclined upper surface for engaging with the tapered rollers 9, said rollers being carried by and projecting below the floor frame 3. The inner surface of the slip ring is provided with teeth 10, forming a circular rack for engagement by the pinion 11 which rotates the crane. This pinion is carried by a vertical shaft 12 extending through the floor frame and having a bevel gear 13 at its upper end meshing with a similar gear 14 on the counter shaft 15. This last-mentioned shaft is supported by suitable pillars 16 on top of the floor frame and is provided at the end opposite the gear 14 with a large bevel gear 17 adapted to mesh with similar gears 18 on the engine shaft 19, according to the direction in which the crane is to be rotated (see dotted lines, Fig. 4).

*Floor frame.*—The floor frame 3 supports the crane proper, together with the boiler 20 and engine 21 for operating the various mechanisms of said crane. The floor frame is an integral casting comprising an upper flat surface 22 forming a floor for the crane and its accessories. Depending from the sides and ends of the floor is the skirt 23. Within said skirt, adjacent the rear end of the floor frame, is the ash pit 24. Ribs 25, 26 integral with the skirt and the floor 22 extend beneath and support the boiler. Adjacent the rear corners of the frame are the sleeves 27 which are integral with the depending skirt and inclined upwardly toward the front of the frame for the reception of the stays or tie rods for the boom. Lugs 28 project laterally from the upper edges of the sides of the floor frame. These lugs are threaded for the reception of bolts 29 by which sheet metal floors 30 are secured to the frame, the outer edges of such floors being supported by means of rods 31 secured thereto and having their ends removably and adjustably secured to the skirt 23, as by nuts 32 (see Fig. 2).

33 designates an integral hub or sleeve depending from near the central portion of the floor frame. A journal sleeve 34 for the shaft 12 is fitted in said former sleeve, the upper portion of said journal sleeve being provided with a flange 35 by means of which it is supported on the floor frame. Bushings 36 are provided near each end of the journal sleeve for the shaft 12. The internal diameter of the hub or sleeve 33 being greater than the diameter of the pinion 11, the shaft 12 and the pinion may be lifted bodily, together with the journal sleeve 34, out of the sleeve 33. This renders the operations of assembling and disassembling the shaft 12 very simple and accomplishes a material saving of time in performing such operations. A similar hub or sleeve 37 depends from the floor frame intermediate the sleeve 33 and the front end of said frame. This sleeve is for the reception of the shaft 8 and its journal sleeve 38. The upper end of the journal sleeve 38 rests in a recess 39 at the upper end of the hub or sleeve 37, and the shaft 8 and its journal sleeve may be removed from and inserted into its hub or sleeve by merely unscrewing the nut 370 from the end of the shaft 8 and removing the gear 7 therefrom.

A rib 40 extends obliquely in opposite directions from the sleeve 33 to the skirt depending from each side of the frame, the two branches forming a V shaped rib. Parallel with the two oblique branches of the rib 40 are ribs 41, 42 extending each from one of the ribs 26 to the adjacent skirt. The floor 22 is cut away between these ribs at 43 and bearing holes 44 are provided in said ribs for the pins 45 of the rollers 9. Similar pairs of ribs 46, 47 are formed adjacent the front end of the floor frame for the reception of the front pair of rollers 9. The ribs 47 extend obliquely across the front corners of the frame, adjacent the depending skirt. In order to permit of the easy boring of the bearing holes 44 for the roller pins, an opening 48 is provided in the skirt and in axial alinement with the proposed location of the pin. This permits of the easy boring of the holes 44 and the easy insertion and removal of the pins from their bearings.

The rollers 9 are provided with bushings 49 by which they are journaled on the pins 45, and the said pins are prevented from rotating by means of a U-shaped plate 50 having vertical branches 51 engaging corresponding slots 52 on each side of the pin 44, said plate being retained in place by means of a bolt 53 threaded into the rib 47. At its front end, the frame is provided with pairs of lugs 54 between which the side members of the boom are pivoted, said boom being of the ordinary tapered type having side members connected by lattice work. Ribs 540, integral with the floor, radiate from the sleeve or hub 37 and connect the same with the sleeve 33, the junction of the ribs 46, and the depending side skirts. These ribs assist the floor in sustaining the weight of the engine and shafting thereabove.

*Housings and shafting.*—Bolted to the floor of the frame 3, adjacent each edge of the same, are the housings 55. These housings support the engine and most of the horizontal counter-shafts by which the various mechanisms of the crane are operated. Extending between these housings, near the upper front portions thereof, is the hollow frame or separator 56. This frame or separator is secured in place by bolts 57 (see Fig. 2). The cylinders 58 are secured, one on the outside of each of these housings, each of said cylinders being provided with steam and exhaust pipes 59 and 60 respectively. Below the cylinders is located the engine shaft 19, said shaft being journaled in the housings and being operated from the cylinder by the link 61, and the crank disk 62. This shaft is provided with the usual eccentrics 205 operating the steam valves through the rods 206 and links 207 (see Fig. 4). Adjacent said engine shaft and directly in front of the same is the counter-shaft 63. The front edge of each of the housings is inclined, as appears in Figs. 1 and 12, and in the inclined edge are formed a support 640 for the boom hoist shaft 64 and a split bearing for the hoisting drum shaft 65. The rotating shaft 12 is operated by the horizontal counter-shaft 15, which is supported by the pillar blocks 16 and is driven from the engine shaft 19.

The housings are particularly constructed with reference to the ease of assembling and disassembling the shafting. Each of the said housings is provided near its lower edge with a recess 66 extending from the rear edge thereof to the vertical rib 67, from the upper portion of which the inclined rib 68 extends which carries the bearings for the shafts 64 and 65. The strengthening rib 69 bounds the lower portion of the recess and is provided with bearings 70 and 71 for the shafts 19 and 63 respectively. The bearings for these shafts are of the ordinary split type and are provided with removable caps 72 and 73 respectively.

The housing above the recess is provided with a rib 74 which merges at its rear end with a sleeve 75. The corresponding lower rib 69 merges with the sleeve 76, both of said sleeves being in vertical alinement. A rearwardly and downwardly inclined rib 77 extends from the rear end of the rib 69 to the base of the housing. A removable sleeve 78 having a corresponding inclined rib 79 is adapted to be inserted between the sleeves 75 and 76 to form therewith a continuous sleeve for the reception of a bolt 80. This bolt is provided at its upper end with a screw-threaded portion 81 and near its lower end with a slot 82. A corresponding slot 83 is formed in the sleeve member 76 for the insertion of a key or locking-pin 84. This key or locking-pin is provided with bottom lugs 85 and an intermediate recessed portion 86.

To assemble the shafts 19 and 63, they are inserted into the recesses 66 and are secured in place in their bearings, after which the sleeve member 78 is fitted between the members 75 and 76, the bolt 80 is inserted, the key or locking-pin 84 is inserted in place and, by means of a nut 87, the bolt is tightened up and the sleeve members are locked together. When it is desired to disassemble the shafts 19 and 63, the nut 87 is slacked up, the locking-pin 84 removed, and the said shafts may then be withdrawn through the recesses of the housings.

The hoisting-drum 88, with its shaft, may be readily removed by unscrewing the journal caps 89 and disconnecting the brake band 90. This brake band being bolted to the rod 91 extending through the frame or separator 56, it is only necessary to unscrew the nuts 92 from the upper end of said rod to disconnect or slacken up the brake and permit the easy removal of the hoisting drum and its shaft.

The boom hoisting apparatus comprises a horizontal counter-shaft 93 journaled in the lower end of brackets 209 integral with and depending from the frame or separator 56, a vertical worm shaft 95 driven from the shaft 93, a worm 96 within the casing or separator 56, engaging a worm gear 97 on the boom hoisting drum, the rear portion of which gear is within said casing or separator. The worm shaft is provided with bushings 98 and 99, the former being journaled in the bottom of the separator 56 and the latter being journaled in a sleeve 100 which is removably fitted in an opening in the upper end of the said casing or separator. The lower end of the shaft 95, outside the casing or separator 56 is tapered, and the beveled gear 101 is removably secured to such tapered portion by means of a nut 102. A pinch collar 103 surrounds the worm shaft, just above the worm, and is operated by means of the hand wheel 104 and shaft 105, to brake the worm shaft in a well-known manner. The brackets 209 are in line with the brackets 94 when the latter are in place in the crane.

The worm gear is inclosed by means of an integral extension 106 of the frame or separator, the said frame and extension inclosing about half of the worm gear. The removable casing 107 completes the inclosure of said worm gear. On each side of the worm, outside of its casing, extends the drum 108 for the cable by which the boom is raised and lowered (see Fig. 1). The drum is provided with journals 211 by which it is rotated on the shaft 64, said shaft being carried by the bearings or supports 640.

In order to remove the worm gear and its shaft, it is only necessary to remove the casing extension 107 and drive the shaft endwise through the drum in which it is journaled, whereupon the drum and worm gear may be withdrawn. To remove the worm and its shaft, it is only necessary to unscrew the hand wheel 104 until the pinch collar is disengaged by the shaft 105, to unscrew the nut 102, and remove the bolts 212 securing the sleeve or journal 100 to the casing or separator 56, whereupon the worm and its shaft, together with the sleeve or journal 100, may be lifted out of the casing or separator.

From the foregoing description, it will be apparent that all the various shafting employed in our crane may be very readily and very quickly and conveniently assembled and disassembled,—a very important factor in the construction of an effective and economical machine of this character.

The rotating shaft 12 is operated from the engine shaft 19 by means of the countershaft 15, which shaft is in turn operated from the engine shaft through the gears 17 and 18 and clutch 19ª, said clutch operating the shaft 15 from either of the gears 18. The counter-shaft 63 is operated from the engine shaft by the reduction gears 109 and 110. The traveling shaft is operated from the shaft 63 by means of the beveled gears 111, 200, and clutch 112. The hoisting drum is operated from the shaft 63 by the reduction gears 113 and 114 and clutch 115. The shaft 93 is operated from the shaft 63 through the gears 110 and 116. The worm shaft is operated from the shaft 93 by means of the gears 117 and 101 and the clutch 118, the boom-hoisting shaft 64 being operated by the worm 96 and worm gear 97.

*Clutch and brake-operating mechanism.*— In order to operate the drum-brake and the clutches, we employ a system of levers 119, 120, 121, 122 and 123. For shifting the steam valve links, we employ the levers 124 and 208, said levers being employed for starting and reversing the engine by hand. All of these levers but the first-mentioned (119) are provided with sleeves by which they are pivoted to the shaft 125 extending through and supported by bearings 126 near the lower ends of a pair of brackets 127. These brackets, as will appear more particularly from Figs. 2, 3, 4 and 5 are substantially triangular, having a vertical leg 128, an upper horizontal leg 129 and an inclined leg 129ª. At each end of the upper horizontal leg 129 is provided an opening 130, 131. These openings are for the reception of rods 132 and 133, between which are secured the quadrants 134, 135, 136, 137, 138 and 139 for the levers 119–124 inclusive. Depending from the rod 132 and sleeved thereon is a bracket 140 for the shaft 105 which operates the pinch collar for the worm shaft 95.

The sleeve of the lever 120 is provided with suitable projecting lugs 141 for the attachment of a link 142 by means of which the bell-crank 143 and the clutch of the rotating shaft are operated. Similar lugs are provided for the lever 121 which operates the boom-hoist clutch, for the lever 122 which operates the main hoist clutch, and for the lever 123 which operates the traveling-shaft clutch. The lugs on the sleeves or hubs of the levers 121, 122, 123 are respectively connected by the links 144, 145 and 146 with the bell-crank levers 147, 148, and 149 which operate such clutches. The lower end of the lever 119 is sleeved onto a short shaft 150 supported by an opening 210 in the housing and the opening 151 at the lower end of the adjacent bracket. The end of the brake-strap 90 for the hoisting drum is secured to said sleeve and a lever 152 adapted to be operated by the foot is also secured to said sleeve, whereby the drum-hoist brake may be applied by hand or foot power or both. Where a double hoisting drum is employed, a similar shaft brake and lever may be employed on the other side of the machine, the brake lever shaft being supported by the corresponding bracket and bearing on that side. Each of the brackets 127 is provided with bolt-holes 153 extending through the front leg thereof, by means of which said brackets may be bolted or otherwise suitably secured to the frame or separator 56. The brackets, with the levers 120–124, and the quadrants 134–139, the links 142, 144, 145 and 146, the shaft 125, rods 132 and 133 and the bracket 140 for the hand wheel and its shaft may be assembled on the floor or work bench, and the assembled parts may be readily inserted into the crane by merely bolting the brackets to the frame or separator 56. After the parts have been so assembled, the lever 119 may be passed through its quadrant 134 and bolted to its sleeve on the shaft 150. Immediately below the brackets is the skeleton frame 154. This frame carries the various clutch operating members which are connected to the links 142, 144, 145 and 146. It is preferably rectangular in outline and is provided with openings 155, 156 and 157 formed between the sides and ends and the integral cross-members 158, 159. The rear and sides of said frame are provided with an integral depending skirt 158ª. The front end of the frame is the cross member 160. This member is bolted to the front ends of the sides of the frame and is provided with depending brackets. Similar brackets 161, 162 are carried by the members 158 and 159 respectively. The shaft 163 of the bell-crank lever 147 by which the boom hoisting clutch collar 164 is operated is pivoted in the member 160 and in the flange 201 of the member 159 (see dotted lines, Fig. 6ª). The shaft 225 of the bell-crank lever 149 for the clutch collar 165 for the traveling shaft of the crane is journaled in the lower ends of the brackets 160ª and 162, the latter bracket depending from the flange 201. The shaft 203 of the operating lever 143 for the clutch collar for the rotating shaft of the crane is journaled in the brackets 162ª, bearings 166 being formed in said brackets for the purpose (see Figs. 4 and 6). Adjacent the side of said frame and journaled in bearings 167 in the brackets 161 and 161ª is the shaft 168 for the clutch collar 169 for the main hoisting shaft. The frame 154 is secured in place by bolts 170 extending through holes 204 in the horizontal flanges at the sides and into the brackets 127, (see Figs. 4 and 6) as well as by bolts 171 extending through the vertical end flange or skirt and an angle iron 172 at the adjacent portion of the platform 173.

By the construction above set forth, it will be evident that the various levers and shafts for operating the clutches may be assembled in place when the frame 154 is on the floor or bench and that the frame with these accessories in place may be bolted in place in the crane, whereupon all that is necessary in order to finish the assembling of the various mechanisms for operating the clutches will be the connecting of the lower ends of the links 142, 144, 145 and 146 with their respective levers. We consider this a very important point in economy and facility of construction, as it enables the clutch-operating mechanisms to be readily and quickly assembled and disassembled.

*Boom-staying and supporting mechanism.—* As hereinbefore described, there is a drum 108 on each side of the casing 107 for the cable 174 by which the boom 4 is raised and lowered. This cable passes from said drum around the sheave 175 near the end of the boom, around a sheave 176, around a duplicate of the sheave 175 on the other side of the boom, and around the drum 108 on the other side of the casing 107. The sheave 176 is supported by a bridle consisting of two pairs of arms 177, the rear ends of which are secured to collars 178 surrounding a shaft 179. This shaft is supported between the upper extremities of the vertical or mast members 180. These members, in the construction shown, are of channel iron and have their lower ends supported between lugs 181 forming the upper extremity of each of the housings 55. These vertical or mast members extend through the roof 182 of the crane, and the shaft 179 and bridle are above said roof. In order to stay or support the upper ends of these mast members, we connect therewith stay members 183 said members being preferably rods. These rods may be connected directly to the said members or indirectly thereto, as through the medium of the shaft 179. The stay rods extend diagonally downward through the roof 182 of the crane to the vertical struts or roof supports 184, passing over saddles 185, carried by said struts, thence down through the sleeves 27 (see Fig. 8), where the ends are set up by means of nuts 186 threaded thereon, (see Fig. 1). We provide the rods 183 each with a stop nut 187 rigid therewith, which nut is adapted to engage a forwardly extending lug 188 on the saddle 185 to prevent strain or breakage of the strut or roof support when the stay rod is tightened. This saddle is fitted into the top of the strut or roof support 184, which is preferably tubular and has a seat therein for the reception of the stay rod. The upper portion of this seat is rounded at 189 and extends diagonally downward therefrom to form an inclined seat 190 corresponding to the inclination of the stay rod when set up. The upper end of the saddle is bifurcated for the reception of the stay rod and the rear faces of the vertical members 191 have bolted thereto a flexible metal plate or strap 192, the upper end of which is secured to the roof of the crane.

The contsruction of the struts and saddles insures a proper lead for the stay rods, while the flexible strap or plate 192 permits of relative movement of the roof and struts, due to the vibration and racking of the parts in operation, without injury to said struts or the roof. The location of the saddle near the roof places the stay rods above the head of the operator.

By the construction hereinbefore described, it will be apparent that we have produced a crane which is simple and durable, effective in operation, economical in construction, which may be readily assembled and disassembled, and which will permit of easy and convenient access to the parts for repairing and renewing the same.

While we have described our invention in detail, it will be obvious that such details may be departed from more or less without avoiding the spirit of our invention, and we do not propose to be limited to such details except as they may be positively included in the claims hereto annexed, or except as such limitations may be rendered necessary by the prior state of the art.

Having thus described our invention what we claim as new and desire to secure by Letters-Patent is:—

1. In a crane, the combination of a roof, hoisting mechanism, a mast for said mechanism, a roof support or strut, a stay for said mast engaging said roof support or strut, and a flexible connection between said support or strut and said roof, substantially as specified.

2. In a crane, the combination of a roof, a boom, a mast, boom hoisting and lowering apparatus supported by said mast, a stay for said mast having its lower end anchored to the body of the crane below the roof and a strut for said stay, said strut being flexibly connected to the roof of the crane, substantially as specified.

3. In a crane, the combination of a roof, a boom, a vertical member or mast, means supported by said vertical member or mast for raising and lowering said boom, a support for the roof, a stay for said vertical member or mast, said stay engaging said roof-support, means for securing the end of said stay, said roof-supporting means comprising a flexible connection between said roof and the portion of said member engaged by said stay, substantially as specified.

4. In a crane, the combination of a roof, a boom, a mast extending above said roof, means supported by said mast for raising and lowering said boom, a stay extending from the upper end of said mast and having its lower end suitably anchored, a vertical strut for said stay, and a flexible connection between said vertical member or strut and said roof, substantially as specified.

5. In a crane, the combination of a roof, a boom, a vertical member or mast for said boom extending above said roof, means supported by said mast for raising and lowering the boom, a floor frame, a stay connected to said mast adjacent its upper end and having its lower end adjustably secured to said floor frame, a vertical member or strut supported by said floor frame and having a saddle thereon for the reception of the stay, and a flexible connection between said saddle and said roof, substantially as specified.

6. In a crane, the combination of a boom, a vertical member or mast, means supported from said mast for raising and lowering said boom, a stay connected with the upper end of said mast and having at its lower end suitable adjusting means, and a strut having a saddle for said stay, said stay being provided with a stop for engaging the saddle when the tension of said stay has been adjusted, substantially as specified.

7. In a crane, the combination of a boom, a mast, means supported from said mast for raising and lowering said boom, a stay connected with said mast and having suitable adjusting means, and a strut having a saddle for said stay, said stay being provided with a stop for engaging the saddle when the tension of the stay has been adjusted, substantially as specified.

8. In a crane, the combination of a boom, a mast for said boom, means supported from said mast for raising and lowering said boom, a stay connected with said mast near the upper end thereof and extending downwardly threfrom, a strut between said boom and the anchor end of said stay, a saddle carried by said strut and having a downwardly inclined seat thereon, a stop on said stay adapted to engage the forward side of said saddle, and means for adjusting the tension of said stay, substantially as specified.

9. In a crane, the combination of a boom, a mast, means supported by said mast for raising and lowering said boom, a tubular strut, a saddle having an inclined seat therein and fitting in the upper end of said tubular strut, a stay rod extending from said mast through the seat of said saddle, means for adjustably securing the end of said stay rod, and a flexible plate connecting said saddle with the roof of the crane, substantially as specified.

10. In a crane, the combination of a boom, a pair of masts, means supported by said masts for raising and lowering said boom, a floor frame, stay rods extending from said masts to said floor frame and having means for anchoring them to said frame, struts carried by said floor frame and having inclined seats for said stay rods, and stops on said stay rods engaging the forward ends of said seats, substantially as specified.

11. In a crane, the combination of a boom, a mast, means supported by said mast for raising and lowering said boom, a stay rod connected with said mast near the upper end thereof and extending downwardly therefrom, means for anchoring said stay rod, a vertical strut intermediate the ends of said stay rod, a saddle carried by said strut and having therein a seat for said stay rod, said seat having a forwardly extending lug and being downwardly inclined, and a stop on said rod adapted to engage said lug, substantially as specified.

12. In a crane, the combination of a boom, side housings, masts pivoted to the upper ends of said housings, means supported by said masts for raising and lowering said boom, a floor frame supporting said housings and boom, said frame being provided at its rear end with inclined sleeves, a stay rod connected with each of said masts at one end and having the opposite end extending through one of said sleeves, and adjusting nuts on the ends of said rods adapted to engage the lower ends of said sleeves, substantially as specified.

13. In a crane or similar device, the combination of side housings, a main shaft and rotating, traveling, main-hoisting and boom-hoisting shafts in said housings, levers for operating said rotating, traveling, main-hoisting and boom-hoisting shafts from the main shaft, quadrants for said levers, a pair of brackets supporting said levers and quadrants, and means for securing said brackets and their connected parts, in assembled condition, in said crane, substantially as specified.

14. In a crane, the combination of side housings, a main shaft, rotating, traveling, main-hoisting and boom-hoisting shafts in said housings, a brake for said boom-hoisting shaft, means for operating said brake, levers for operating said rotating, traveling, main-hoisting and boom-hoisting shafts from the main shaft, a pair of brackets supporting said levers and said brake-operating means, and means for securing said brackets and their connected parts in place in said crane in assembled condition, substantially as specified.

15. In a crane, the combination of main, traveling, and hoisting shafts, levers for operating the last two shafts from the main shaft, a frame for said levers, means for assembling the levers in said frame, and means for securing said frame and the levers, in such assembled condition, in said crane, substantially as specified.

16. In a crane, the combination of a main shaft, a hoisting shaft, and a shaft for raising and lowering the boom, levers for operating the last two shafts from the main shaft, quadrants for said levers, a frame for said levers and quadrants, means for assembling the levers and quadrants in said frame, and means for securing in said crane the frame with the levers and quadrants in assembled condition, substantially as specified.

17. In a locomotive crane, the combination of a floor frame, a truck below said frame, a slip ring having a circular rack and supported by said truck, a pinion engaging said rack, a vertical shaft extending through said frame and carrying said pinion, a vertical traveling shaft extending through said frame for driving the crane along the track, said shafts being adapted to be removed through the floor of the frame, substantially as specified.

18. In a crane, the combination of a floor frame, a truck below said frame, a slip ring and a circular rack supported by said truck, rollers carried by said frame and engaging said slip ring, a pinion engaging said rack, a vertical shaft carrying said pinion, a sleeve or hub depending from the floor frame, a journal sleeve for the shaft adapted to rest on top of the floor frame, the diameter of the pinion being less than the internal diameter of the depending hub or sleeve, whereby said shaft and pinion may be withdrawn through said hub or sleeve, substantially as specified.

19. A floor frame for a rotating crane consisting of an integral casting comprising a floor, a hub or sleeve depending from said floor, V-shaped ribs cast with said floor and connecting opposite portions of a skirt, ribs connecting said hub or sleeve and opposite portions of said skirt, and additional ribs connecting said hub or sleeve and said V-shaped ribs, substantially as specified.

20. A floor frame for a rotating crane, consisting of an integral casting comprising a floor, a hub or sleeve for the rotating shaft of said crane depending from said floor, a hub or sleeve for the traveling shaft of said crane depending from said floor, and ribs connecting said sleeves with each other and with the said skirt, substantially as specified.

21. A floor frame for a rotating crane consisting of an integral casting comprising a floor, pairs of diagonal ribs formed with said floor and spaced to form pockets, combined with rollers in said pockets, and pins for said rollers mounted in said pairs of ribs, said floor being provided with holes above said rollers, substantially as specified.

22. A floor frame for a rotating crane consisting of an integral casting comprising a floor, a skirt depending from an edge of said floor, a pair of ribs extending diagonally with respect to a corner of the frame and spaced to form a pocket, a roller in said pocket, a pin for said roller removably supported in said ribs, the skirt having an opening in axial alinement with said pin, substantially as specified.

23. A floor frame for a rotating crane comprising a pair of depending ribs forming a pocket, a roller, a pin for said roller supported in openings in said ribs, one end of said pin extending through and beyond the outer surface of its rib and provided adjacent said surface with oppositely arranged slots, a U-shaped locking plate having its branches or legs arranged to engage the slots in said openings, and means for removably securing said plate to said rib, substantially as specified.

24. A floor frame for a rotating crane consisting of an integral casting comprising a floor, a skirt depending from an edge of said floor, a pair of ribs extending diagonally with respect to a corner of said frame and spaced to form a pocket, a roller in said pocket, a pin for said roller removably mounted in said ribs, a skirt having an opening in alinement with said pin, and means secured to said rib to prevent such pin from rotating, substantially as specified.

25. A floor frame for a crane consisting of an integral casting comprising a floor, a skirt depending from a side edge of said floor, said skirt having lugs projecting from near the upper edge thereof, an extension plate bolted to said lugs, and brace rods secured adjacent to the outer edge of said plate and having their lower ends removably secured adjacent to the lower edge of said skirt, substantially as specified.

26. A frame for locomotive cranes consisting of an integral casting comprising a depending skirt, an ash pit for the boiler, hubs or sleeves for the rotating and traveling shafts, ribs connecting said hubs or sleeves with each other and with said skirt, and ribs extending beneath said ash pit and connected with said skirt, substantially as specified.

27. A frame for cranes consisting of an integral casting comprising a depending skirt, an ash pit for the boiler, a hub or sleeve for the rotating shaft of the crane, ribs connecting said hub or sleeve with said skirt, and ribs extending beneath said ash pit and connected with said skirt and with the first mentioned ribs, substantially as specified.

In testimony whereof we affix our signatures in the presence of two witnesses.

VICTOR R. BROWNING.
EARL HARRISON BROWNING.

Witnesses:
C. E. WHITE,
J. B. HULL.